United States Patent
McCaffrey

(10) Patent No.: US 11,261,744 B2
(45) Date of Patent: Mar. 1, 2022

(54) CERAMIC MATRIX COMPOSITE ROTOR BLADE ATTACHMENT

(71) Applicant: United Technologies Corporation, Farmington, CT (US)

(72) Inventor: Michael G. McCaffrey, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/441,676

(22) Filed: Jun. 14, 2019

(65) Prior Publication Data

US 2020/0392856 A1    Dec. 17, 2020

(51) Int. Cl.
| | |
|---|---|
| *F01D 5/30* | (2006.01) |
| *F01D 5/02* | (2006.01) |
| *F01D 5/08* | (2006.01) |
| *F01D 5/28* | (2006.01) |

(52) U.S. Cl.
CPC .............. *F01D 5/3015* (2013.01); *F01D 5/02* (2013.01); *F01D 5/081* (2013.01); *F01D 5/284* (2013.01); *F01D 5/3084* (2013.01); *F05D 2220/323* (2013.01); *F05D 2230/60* (2013.01); *F05D 2240/30* (2013.01); *F05D 2260/202* (2013.01); *F05D 2300/6033* (2013.01)

(58) Field of Classification Search
CPC ........ F01D 5/3007; F01D 5/3015; F01D 5/32; F01D 5/30
See application file for complete search history.

(56) References Cited

U.S. PATENT DOCUMENTS

| | | | |
|---|---|---|---|
| 3,219,263 A * | 11/1965 | Davies | F04D 29/023 415/193 |
| 3,801,222 A | 4/1974 | Violette | |
| 4,111,603 A | 9/1978 | Stahl | |
| 5,222,865 A * | 6/1993 | Corsmeier | F01D 5/3007 416/193 A |
| 7,284,958 B2 | 10/2007 | Dundas et al. | |
| 8,251,651 B2 * | 8/2012 | Propheter-Hinckley | F01D 5/3015 415/200 |
| 8,408,874 B2 | 4/2013 | McCaffrey et al. | |
| 2007/0189901 A1 | 8/2007 | Dundas | |
| 2019/0323372 A1 | 10/2019 | Freeman et al. | |

FOREIGN PATENT DOCUMENTS

EP    2108785 A2    10/2009

OTHER PUBLICATIONS

Ken Harris; Improved Single Crystal Superalloys; 2004; The Minerals, Metals, and Materials Society; p. 1 (Year: 2004).*
EP Search Report dated Oct. 21, 2020 issued for corresponding European Patent Application No. 20179070.6.

* cited by examiner

*Primary Examiner* — Michael L Sehn
(74) *Attorney, Agent, or Firm* — Bachman & LaPointe, P.C.

(57) ABSTRACT

A rotor disk assembly for a gas turbine engine. A multiple of blade attachments each received within a slot in a rotor disk. The rotor blade attachment manufactured of a metal alloy and a rotor blade retained between each two of the multiple of blade attachments, the rotor blade manufactured of non-metal alloy.

13 Claims, 9 Drawing Sheets

CERAMIC MATRIX COMPOSITE ROTOR BLADE ATTACHMENT

BACKGROUND

The present disclosure relates to ceramic matrix composite (CMC) turbine blade assemblies, and more particularly, to a separate blade attachment with a blade platform therefor.

Gas turbine engines, such as those which power modern commercial and military aircraft, include a compressor section, combustor section and turbine section arranged longitudinally around the engine centerline so as to provide an annular gas flow path. The compressor section compresses incoming atmospheric gases that are then mixed with a combustible fuel product and burned in the combustor section to produce a high energy exhaust gas stream. The turbine section extracts power from the exhaust gas stream to drive the compressor section. The exhaust gas stream produces forward thrust as it rearwardly exits the turbine section. Some engines may include a fan section, which is also driven by the turbine section, to produce bypass thrust.

Gas path components, such as turbine blades manufactured of nickel-based super alloys that operate in the high temperatures encountered by aerospace and gas turbine engines, typically include airfoil cooling that may be accomplished by external film cooling, internal air impingement, and forced convection, either separately, or in combination. More recently, ceramic matrix composite (CMC) rotor blades have the potential to operate in the high temperatures without airfoil cooling.

To utilize the high temperature capabilities, CMC rotor blades often utilize a relatively long neck region to separate the hot (e.g., about 2400-2700 F (1316-1482 C)) airfoil section of the rotor blade from the root section of the rotor blade that operates at relatively lower temperatures (e.g., about 1300 F (704 C)). The relatively high conductivity of the CMC materials conducts heat from the airfoil section, into the neck section, then into the root section which is in contact with the nickel-based super alloy rotor disk. Typically small features are added to the blade neck region to shield the nickel-based superalloy disk from the hot flowpath which might leak past the gaps between adjacent blades. Manufacture of CMC blades require many features that may create regions of low fiber density and resulting porosity. These small features require equally small cut fabric sheet which must be handled without damaging the woven structure which is relative expensive and time consuming.

SUMMARY

A blade attachment for a gas turbine engine according to one disclosed non-limiting embodiment of the present disclosure includes a blade attachment root section; and a blade attachment platform section that extends from the blade attachment root section, the blade attachment platform section having a first and second recess in a platform transverse to the rotor blade attachment root section, the blade attachment platform section forming a top surface of the rotor blade attachment.

A further aspect of the present disclosure includes that the rotor blade attachment root section and the blade attachment platform section are integral.

A further aspect of the present disclosure includes that the rotor blade attachment root section comprises a flared surface for receipt into a disk slot.

A further aspect of the present disclosure includes that the rotor blade attachment is manufactured of a metal alloy.

A further aspect of the present disclosure includes that the rotor blade attachment root section comprises a cooling circuit.

A further aspect of the present disclosure includes that the first and second recess each are shaped to receive a non-metal alloy blade.

A further aspect of the present disclosure includes that the non-metal alloy blade comprises a ceramic matrix composite root attachment that transitions into a ceramic matrix composite airfoil without a platform therebetween.

A rotor disk assembly for a gas turbine engine according to one disclosed non-limiting embodiment of the present disclosure includes a rotor disk with a multiple of slots in a rim about an axis, the rotor disk manufactured of a metal alloy; a multiple of blade attachments, each blade attachment received in one of the multiple of slots, the rotor blade attachment manufactured of a metal alloy; and a rotor blade retained between each two of the multiple of blade attachments, the rotor blade manufactured of non-metal alloy.

A further aspect of the present disclosure includes that the rotor blade is manufactured of ceramic matrix composite.

A further aspect of the present disclosure includes that the rotor blade comprises a ceramic matrix composite root attachment integral to an airfoil, the ceramic matrix composite root attachment transitions into the airfoil without a platform therebetween.

A further aspect of the present disclosure includes that each of the multiple of blade attachments comprise a blade attachment platform section that extends from a blade attachment root section, the blade attachment platform section having a first and second recess in a platform transverse to the rotor blade attachment root section, the blade attachment platform section forming a top surface of the rotor blade attachment.

A further aspect of the present disclosure includes that the rotor blade attachment root section comprises a cooling circuit.

A further aspect of the present disclosure includes that the rotor blade attachment root section comprises a flared surface for retention in the disk slot.

A method of assembling a rotor disk assembly for a gas turbine engine according to one disclosed non-limiting embodiment of the present disclosure includes retaining a multiple of platform-less rotor blades to a rotor disk via a multiple of blade attachments, the multiple of platform-less rotor blades manufactured of a non-metal alloy material and the multiple of blade attachments manufactured of a metal alloy material.

A further aspect of the present disclosure includes communicating an airflow through each of the multiple of blade attachments.

A further aspect of the present disclosure includes retaining each of the multiple of blade attachments between each two of the multiple of platform-less rotor blades.

A further aspect of the present disclosure includes retaining each of the multiple of blade attachments within a blade slot of the rotor disk.

A further aspect of the present disclosure includes retaining each of the multiple of the platform-less rotor blades adjacent to a rim of the rotor disk.

A further aspect of the present disclosure includes spacing a root attachment of each of the multiple of the platform-less rotor blades from the rim of the rotor disk.

A further aspect of the present disclosure includes locating each of the multiple of blade attachments adjacent to each other thereby shielding the rim of the rotor disk with a blade attachment platform section.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
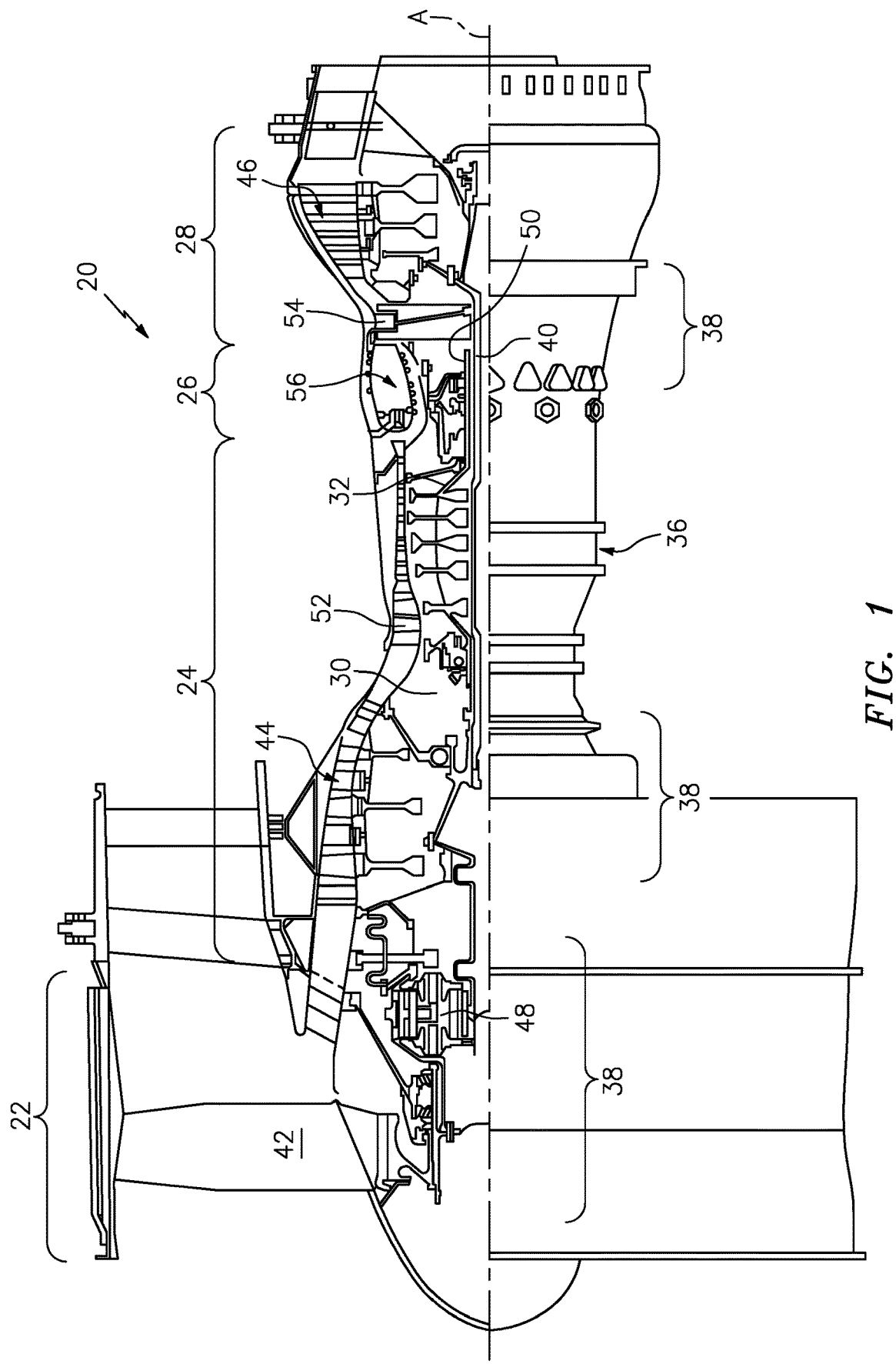
FIG. 1 is a schematic cross-section of an example gas turbine engine architecture.

FIG. 1 schematically illustrates a gas turbine engine 20. The gas turbine engine 20 as disclosed herein is a two spool turbofan that generally incorporates a fan section 22, a compressor section 24, a combustor section 26, and a turbine section 28. The fan section 22 drives air along a bypass flowpath while the compressor section 24 drives air along a high temperature core flowpath for compression and communication into the combustor section 26, then expansion through the turbine section 28. Although depicted as a high bypass gas turbofan engine architecture in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine case structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor ("HPC") 52 and high pressure turbine ("HPT") 54. A combustor 56 is arranged between the HPC 52 and the HPT 54.

Figure 2:
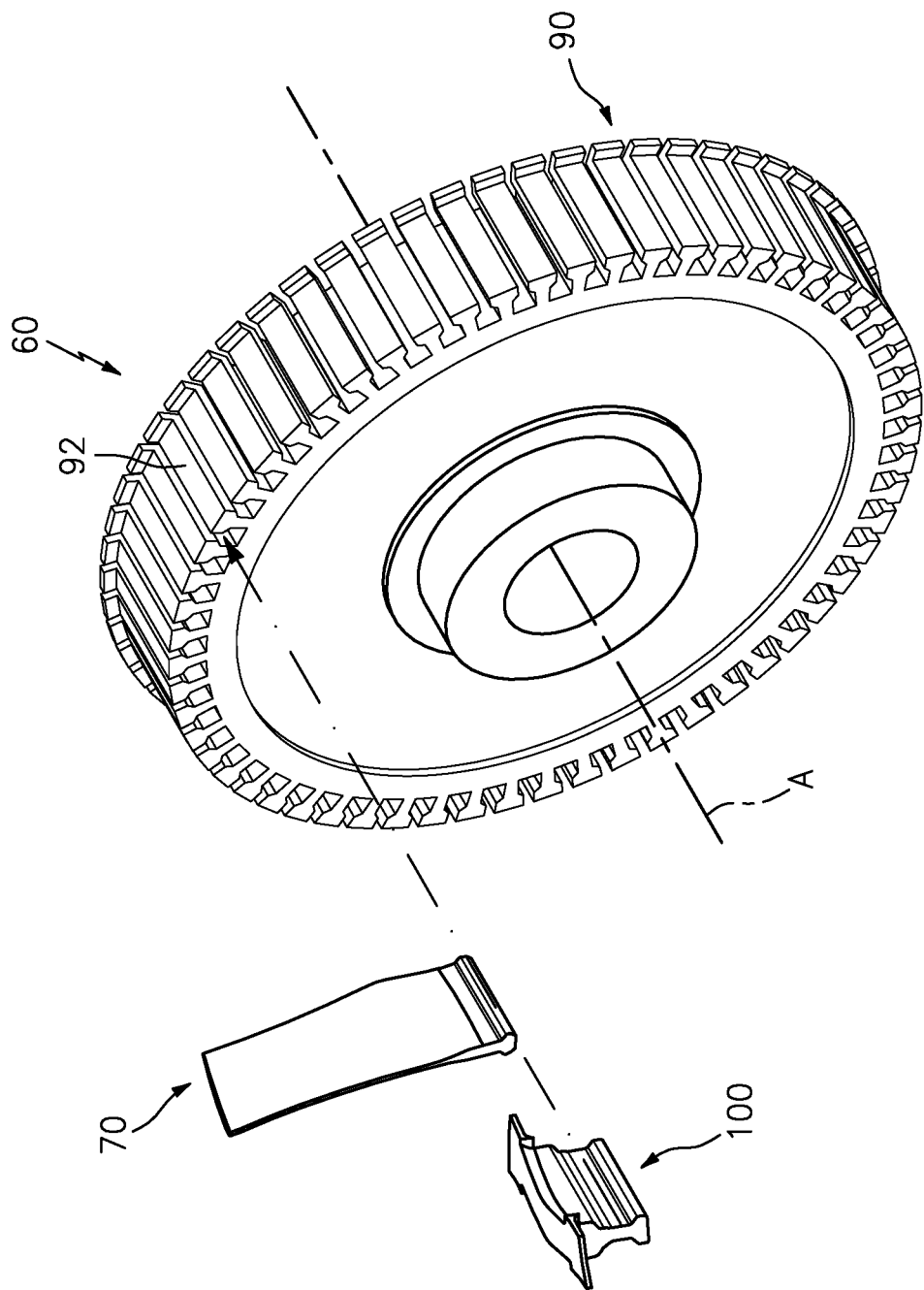
FIG. 2 is an exploded view of a rotor assembly with a single representative ceramic matrix composite turbine blade and rotor blade attachment.
Figure 3:
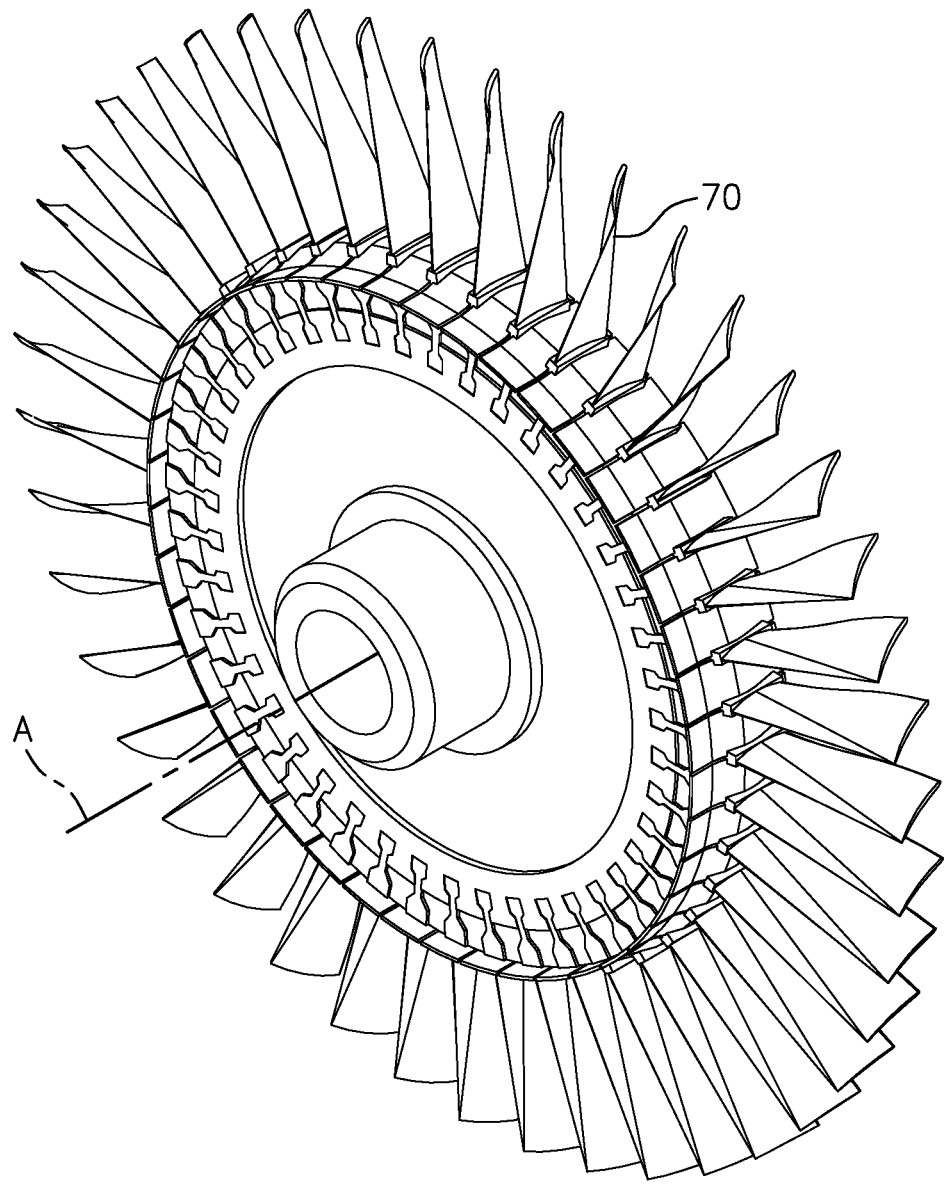
FIG. 3 is a perspective view of a rotor assembly with an array of ceramic matrix composite turbine blade and rotor blade attachments.
Figure 4:
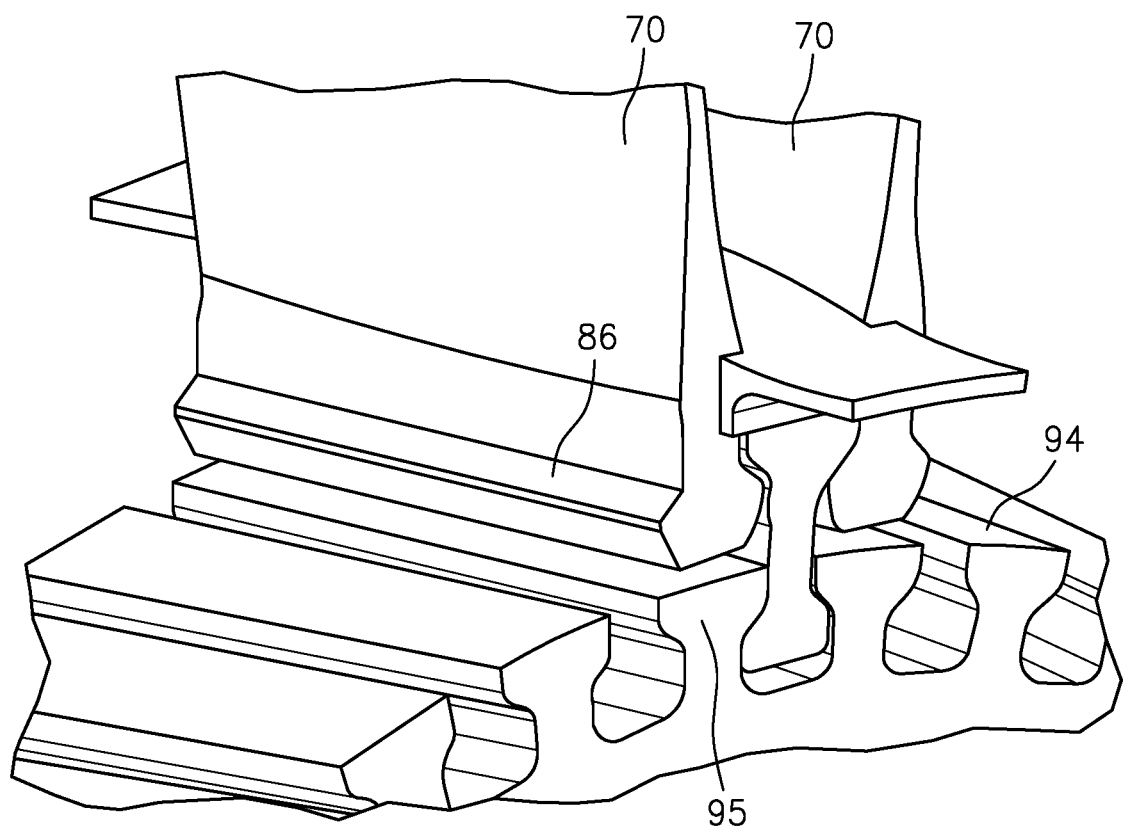
FIG. 4 is an expanded perspective view a pair of ceramic matrix composite turbine blades and associated rotor blade attachment.

With reference to FIG. 2, a rotor assembly 60 such as a turbine rotor assembly includes an array of blades 70 (only one shown) circumferentially disposed around and retained to a disk 90 by respective blade attachments 100 (also shown in FIG. 3). Each blade attachment 100 is received in a respective slot 92 in the disk 90 and the array of blade attachments 100 thereby retain the array of blades 70 such that each blade 70 is spaced away from a rim 94 of the disk 90 (FIG. 4).

Figure 5:
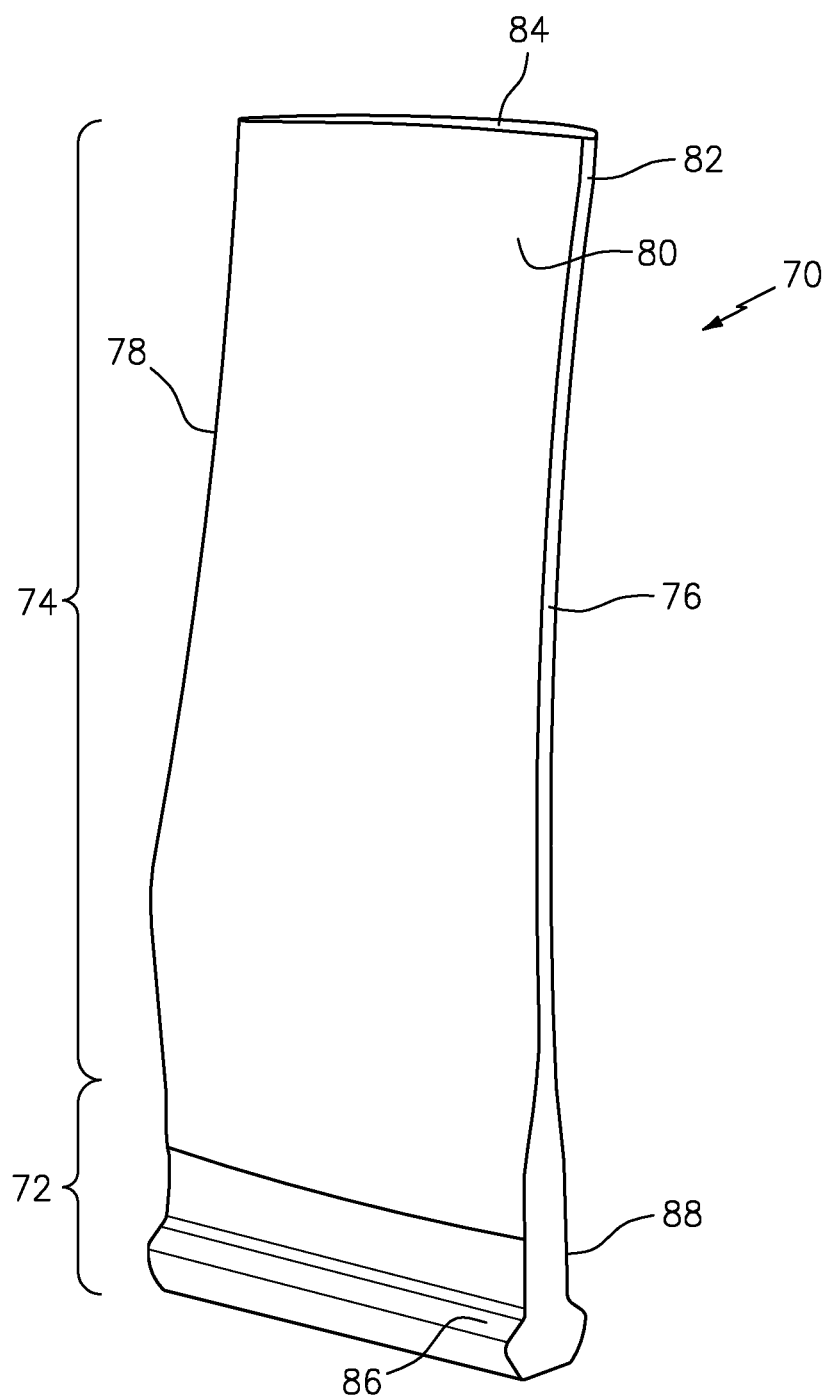
FIG. 5 is an expanded perspective view of a ceramic matrix composite turbine blade.

With reference to FIG. 5, each blade 70 includes a root attachment 72 and an airfoil 74. The airfoil 74 defines a blade chord between a leading edge 76 and a trailing edge 78. A first sidewall 80 that may be convex to define a suction side, and a second sidewall 82 that may be concave to define a pressure side are joined at the leading edge 76 and at the axially spaced trailing edge 78. A blade tip 84 extends between the sidewalls 80, 82 opposite the root attachment 72. The root attachment 72 transitions into the airfoil 74 without a platform therebetween.

In the illustrated embodiment, the root attachment 72 includes a flared surface 86 adjacent to a neck 88. However, other shapes such as teardrop, fir-trees, and other shapes are contemplated. The relatively simple root attachment 72 facilitates a relatively short neck 88. The root attachment 72 may be silicon plasma sprayed to facilitate final machining of the shape into the CMC materials. The blade 70 includes relatively simple geometries that are loaded primarily in one direction (radial pull) and have been created in ceramic matrix composite (CMC) or organic matrix composite (OMC) material with relatively direct ply orientations, with minimal bending.

The ceramic matrix composite (CMC) or organic matrix composite (OMC) material typically includes laying up pre-impregnated composite fibers having a matrix material already present (prepreg) to form the geometry of the part (pre-form), autoclaving and burning out the pre-form, infiltrating the burned-out pre-form with the melting matrix material, and any machining or further treatments of the pre-form. Infiltrating the pre-form may include depositing the ceramic matrix out of a gas mixture, pyrolyzing a pre-ceramic polymer, chemically reacting elements, sintering, generally in the temperature range of 1700-3000 F (925-1650 C), or electrophoretically depositing a ceramic powder. With respect to turbine airfoils, the CMC may be located over a metal spar to form only the outer surface of the airfoil. Examples of CMC materials include, but are not limited to, carbon-fiber-reinforced carbon (C/C), carbon-fiber-reinforced silicon carbide (C/SiC), silicon-carbide-fiber-reinforced silicon carbide (SiC/SiC), alumina-fiber-reinforced alumina, or combinations thereof. The CMC may have increased elongation, fracture toughness, thermal shock, dynamic load capability, and anisotropic properties as compared to a monolithic ceramic structure.

Replicating the complex features of the rotor blade attachment 100 in metal is readily understood while the marginal utility for manufacturing the platform in CMC may be less than desired. The rotor blade attachment 100 and the disk 90 may be subtractive or additive manufactured of cobalt-based or nickel-based super alloys that operate in high temperature environments, such as, for example, environments typically encountered by aerospace and gas turbine engine hot section components. The rotor blade attachment 100 may also be manufactured of a single crystal (SX) material. The additive manufacturing process sequentially builds-up layers of atomized alloy and/or ceramic powder material that include but are not limited to, 625 Alloy, 718 Alloy, 230 Alloy, stainless steel, tool steel, cobalt chrome, titanium, nickel, aluminum and others in atomized powder material form. Alloys such as 625, 718 and 230 may have specific benefit for parts that operate in high temperature environments, such as, for example, environments typically encountered by aerospace and gas turbine engine components.

Figure 6:
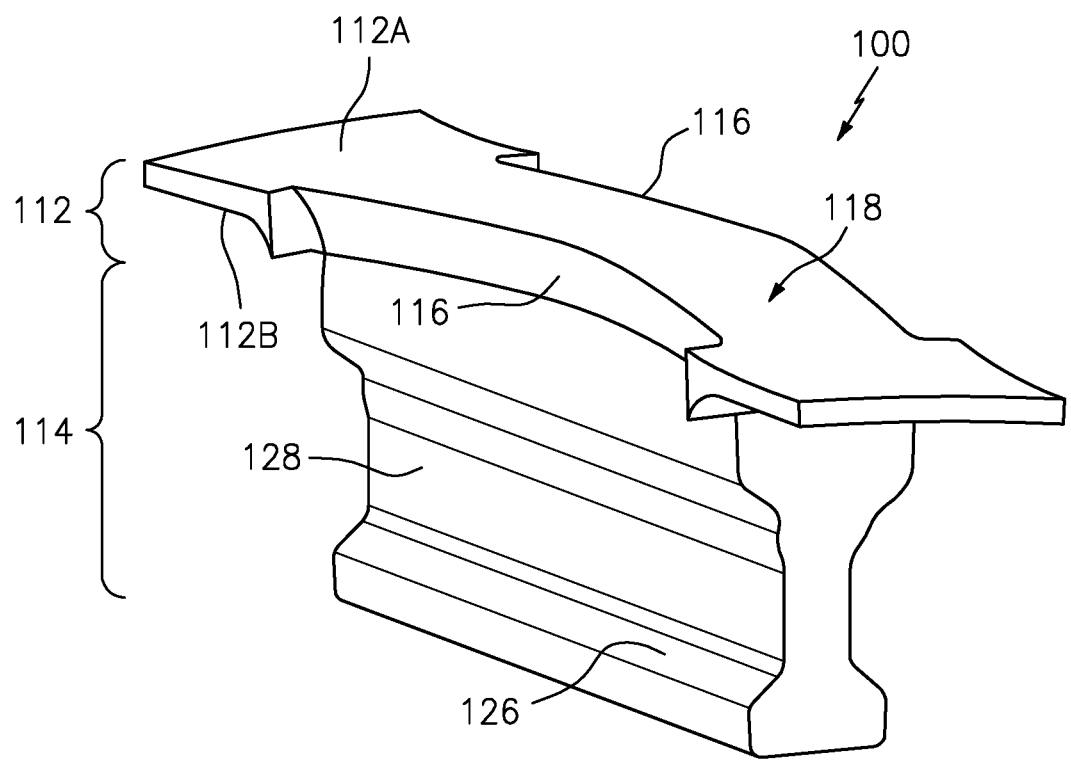
FIG. 6 is an expanded perspective view of a rotor blade attachment.

With reference to FIG. 6, each blade attachment 100 generally includes a blade attachment platform section 112 and a blade attachment root section 114. The blade attachment platform section 112 separates a gas path side 112A inclusive of the airfoil 74 and a non-gas path side 112B. Core combustion gases flow around the airfoil and over the blade attachment platform section 112 while secondary airflow flows under the blade attachment platform section 112.

Figure 7:
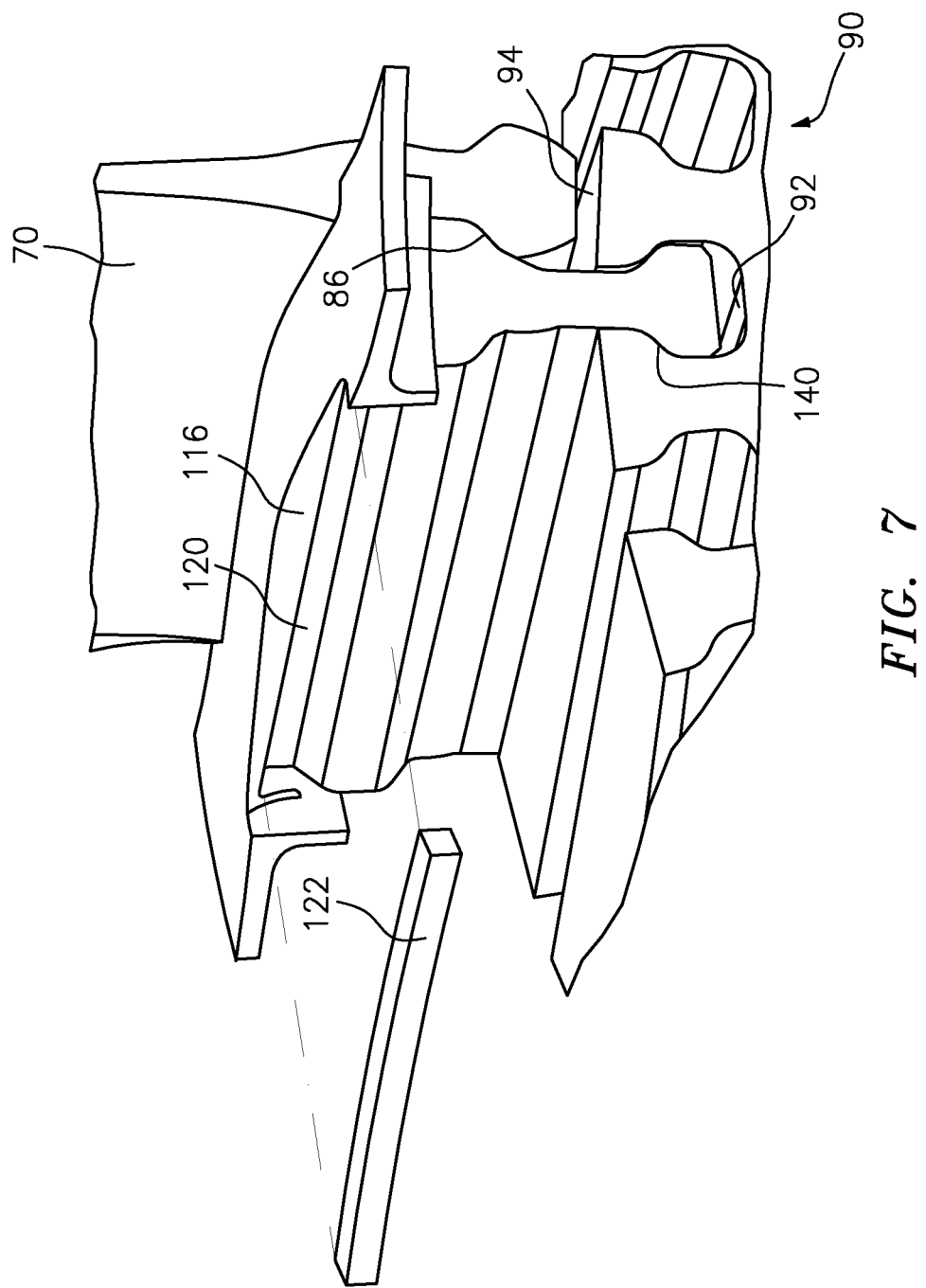
FIG. 7 is an expanded perspective view of a ceramic matrix composite turbine blades and associated rotor blade attachment to the rotor disk.

The blade attachment platform section 112 includes recesses 116 in a transverse platform 118, also forming the top surface of the rotor blade attachment 100, through which the rotor blade 70 passes. The recesses 116 also provide a pocket 120 for receipt of a damper 122 and/or seal (FIG. 7). Hot combustion gases that flow over the platform are prevented from leaking between adjacent turbine blades by a seal, as components below the platform are generally not designed to operate for extended durations exposed to the elevated temperatures of the hot combustion gases. In addition to the seal, a damper may be located between adjacent turbine blades to dissipate vibration through frictional contact between the damper and an underplatform surface of the two adjacent blade attachment platform sections 112.

The rotor blade attachment root section 114 includes a lower flared surface 126 adjacent to a neck 128. The lower flared surface 126 engages a lug 140 formed in the slot 92 in the rim 94 of the disk 90 (FIG. 7). The rotor blade attachment root section 114 includes an upper flared surface 130 adjacent to the neck 128 to retain the flared surface 86 of the root attachment 72. That is, the rotor blade attachment root section 114 is essentially an "I-beam-like-shape". Although a particular engagement surface is disclosed, other shapes such as teardrop, fir-trees, and others are contemplated.

The array of blade attachments 100 are retained in the disk 90 such that each respective blade 70 is retained between two blade attachments 100 and the blade attachment platform section 112 are adjacent. That is, each blade 70 is retained to the rotor disk 90 between the disk slots 92 adjacent to, but spaced from the rim 94. Thus, half the load of each blade 70 is transferred into one side of the rotor blade attachment 100, and half of the load from the adjacent blade 70 is transferred into the other side of the rotor blade attachment 100 to provide a balanced system.

Figure 8:
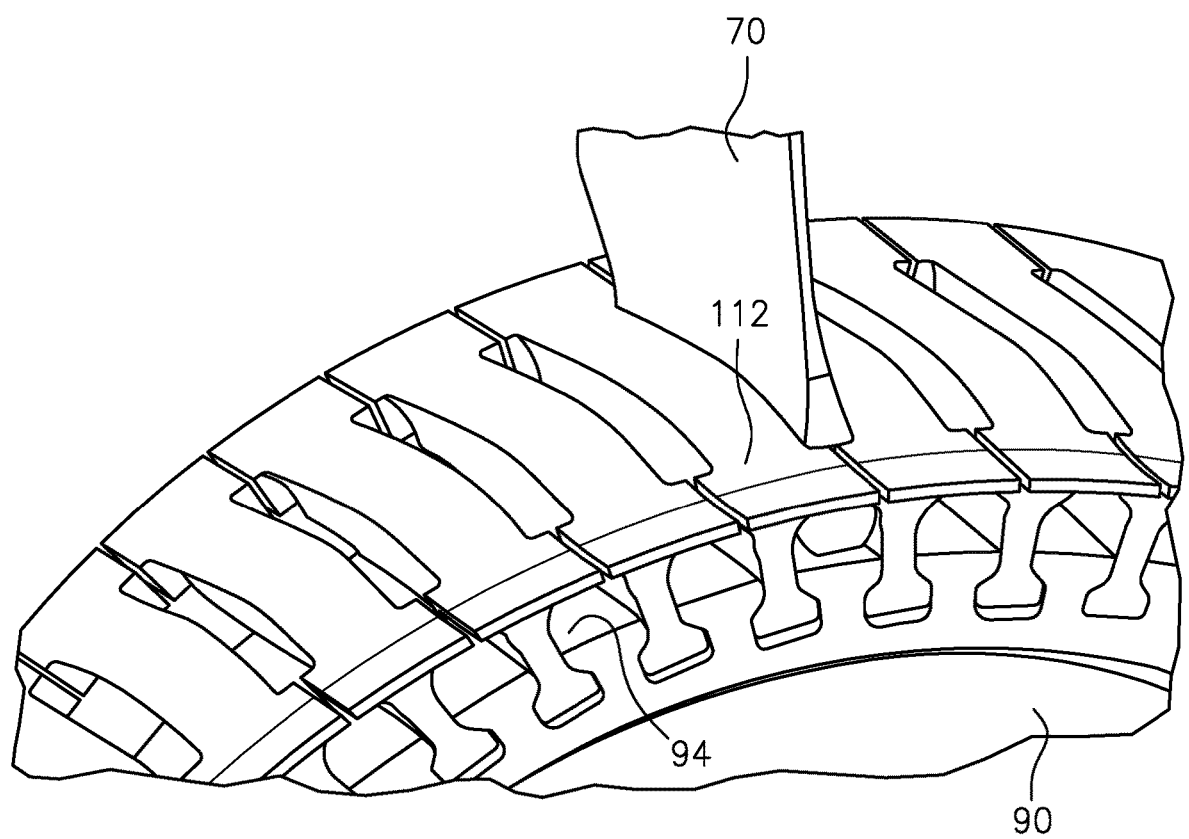
FIG. 8 is a perspective view of a rotor assembly with an array of rotor blade attachments which shield the rotor disk.

With reference to FIG. 8, the array of adjacent blade attachment platform sections 112 are spaced from the rim 94 of the disk 90 to shield the disk 90 from core airflow. The array of blade attachments 100 also displace the high temperature blade root attachment 72 from the disk 90 such that the temperatures of the disk 90 remain within acceptable metal temperatures, with minimal cooling air usage.

Figure 9:
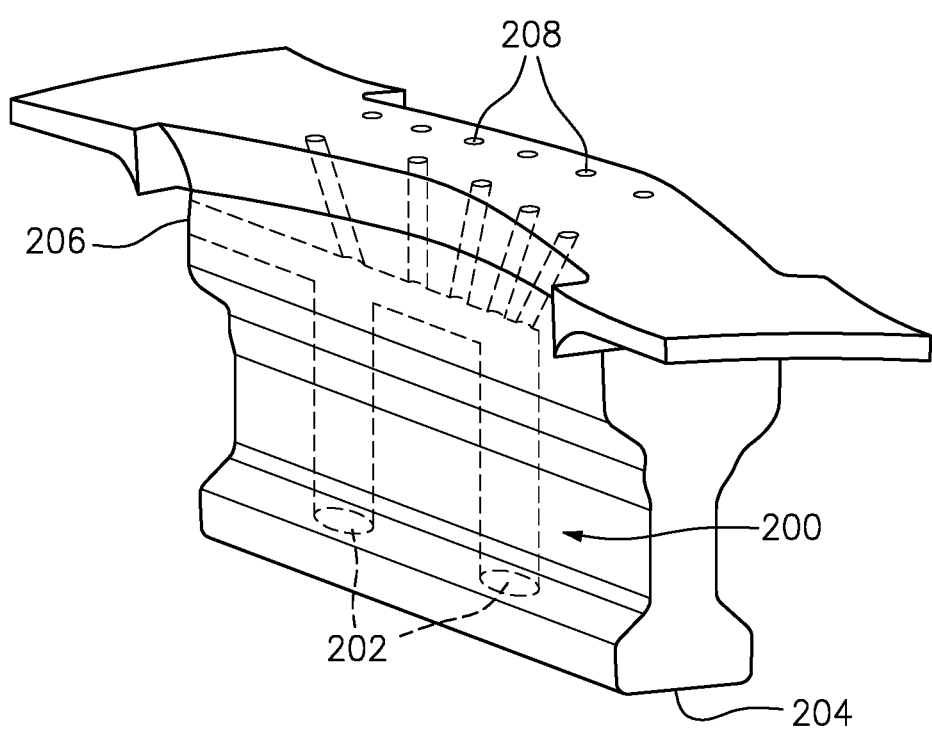
FIG. 9 is an expanded perspective view of a rotor blade attachment with a cooling circuit therein.

With reference to FIG. 9, in another embodiment, the rotor blade attachment 100 may additionally include a cooling circuit 200. The cooling circuit 200 may include an inlet 202 in a base 204 of the rotor blade attachment root section 114 with a purge exit 206 and a film cooling exit 208 along the blade attachment platform section 112. The cooling circuit 200 facilitates maintenance of the blade root attachment 72 operatizing temperature, yet permits the disk lug 95 (FIG. 4) between each disk slot 92 to operate below about 1300 F. The cooling circuit 200 provided in the contact region removes heat, thus reducing the heat transfer into the disk lug 95. An increase to the permitted blade root attachment 72 temperatures reduces the overall thermal gradient in the airfoil 74 to reduce overall the thermal stresses.

The value of the CMC rotor blade is in the airfoil itself. Having a separate platform, manufactured from cast or additively manufactured metal alloy, is substantially less expensive than features that must be replicated in stacked layers of CMC fabric.

Further, the separate platform permits the circumferential pitch (width per blade root) to be relatively smaller, which can increase the number of blades around a given disk circumference and/or provide a shorter disk attachments to account for the reduced section thickness of the disk attachment lug. Removing the platform features from the CMC Blade itself reduces the width of the root and neck, and greatly reduce the axial length of the attachment, while facilitating the manufacture of a high airfoil.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed:

1. A rotor blade attachment for a gas turbine engine, comprising:
    a rotor blade attachment root section comprising a flared surface adjacent to a neck, the flared surface engaged within a respective disk slot in a rim of a rotor disk, each disk slot adjacent to a disk lug; and
    a rotor blade attachment platform section that extends from the rotor blade attachment root section, the rotor blade attachment platform section having a first and second recess in a platform transverse to the rotor blade attachment root section, the rotor blade attachment platform section forming a top surface of the rotor blade attachment, the first recess contoured to a suction side of a first non-metal alloy blade and the second recess contoured to a pressure side of an adjacent second non-metal alloy blade, each of the first and the second non-metal alloy blades comprises a ceramic matrix composite root attachment that transitions into a ceramic matrix composite airfoil without a platform therebetween, and each non-metal alloy blade retained directly outboard of a respective disk lug and between the disk slots, wherein the rotor blade attachment root section is manufactured of a metal alloy and contains a cooling circuit, the cooling circuit comprises an inlet in a base of the rotor blade attachment root section with a purge exit and a film cooling exit along the rotor blade attachment platform section, the purge exit directed through a trailing edge of the rotor blade attachment platform section below the platform transverse to the rotor blade attachment root section, and the film cooling exit directed toward the suction side and the pressure side.

2. The rotor blade attachment as recited in claim 1, wherein the rotor blade attachment root section and the rotor blade attachment platform section are integral.

3. The rotor blade attachment as recited in claim 1, wherein the first and second recess each include a pocket.

4. The rotor blade attachment as recited in claim 3, further comprising a damper that is received within the pockets.

5. A rotor disk assembly for a gas turbine engine, comprising:
a rotor disk with a multiple of disk slots in a rim about an axis, the rotor disk manufactured of a metal alloy, each disk slot adjacent to a disk lug;
a multiple of non-metal alloy platform-less rotor blades; and
a multiple of rotor blade attachments manufactured of a metal alloy, each of the multiple of rotor blade attachments located between each two of the multiple of non-metal alloy platform-less rotor blades to retain the multiple of non-metal alloy platform-less rotor blades to the rotor disk, each of the multiple of rotor blade attachments comprises a flared surface adjacent to a neck, the flared surface engaged within a respective one of the multiple of disk slots, wherein each of the multiple of rotor blade attachments comprises a rotor blade attachment platform section having a first and second recess in a platform transverse to a rotor blade attachment root section, the rotor blade attachment platform section forming a top surface of the rotor blade attachment, the first recess contoured to a suction side of a first of the multiple of non-metal alloy platform-less rotor blades and the second recess contoured to a pressure side of a second of the multiple of non-metal alloy rotor blades, each of the multiple of non-metal alloy rotor blades retained directly outboard of a respective disk lug and between the disk slots, the rotor blade attachment root section contains a cooling circuit, the cooling circuit comprises an inlet in a base of the rotor blade attachment root section with a purge exit and a film cooling exit along the rotor blade attachment platform section, the purge exit directed through a trailing edge of the rotor blade attachment platform section below the platform transverse to the rotor blade attachment root section and the film cooling exit directed toward the suction side and the pressure side.

6. The assembly as recited in claim 5, wherein each of the multiple of non-metal alloy platform-less rotor blades are manufactured of ceramic matrix composite.

7. The assembly as recited in claim 6, wherein each of the multiple of non-metal alloy platform-less rotor blades comprise a ceramic matrix composite root attachment integral to an airfoil, the ceramic matrix composite root attachment transitions into the airfoil without a platform therebetween.

8. The assembly as recited in claim 6, wherein the rotor blade attachment root section comprises the flared surface for retention in a slot of the multiple of disk slots.

9. A method of assembling a rotor disk assembly for a gas turbine engine, comprising:
retaining a multiple of non-metal alloy platform-less rotor blades to a rotor disk via a multiple of rotor blade attachments, the multiple of non-metal alloy platform-less rotor blades manufactured of a non-metal alloy material and the multiple of rotor blade attachments manufactured of a metal alloy material, each of the multiple of rotor blade attachments located between each two of the multiple of non-metal alloy platform-less rotor blades to retain the multiple of non-metal alloy platform-less rotor blades to the rotor disk, each one of the multiple of rotor blade attachments comprising a rotor blade attachment root section with a flared surface for receipt into one respective disk slot of the rotor disk, each non-metal alloy platform-less rotor blade retained directly outboard of a respective disk lug and between the disk slots; and
communicating an airflow through each of the multiple of rotor blade attachments during operation of the gas turbine engine, the airflow being communicated with a cooling circuit comprising an inlet in a base of the rotor blade attachment root section with a purge exit and a film cooling exit along a rotor blade attachment platform section having a platform, the purge exit directed through a trailing edge of the rotor blade attachment platform section below the platform transverse to the rotor blade attachment root section, and the film cooling exit directed toward a suction side of a first of the multiple of non-metal alloy platform-less rotor blades and a pressure side of a second of the multiple of non-metal alloy platform-less rotor blades.

10. The method as recited in claim 9, further comprising retaining each of the multiple of the non-metal alloy platform-less rotor blades adjacent to a rim of the rotor disk.

11. The method as recited in claim 10, further comprising spacing a root attachment of each of the multiple of the non-metal alloy platform-less rotor blades from the rim of the rotor disk.

12. The method as recited in claim 10, further comprising locating each of the multiple of rotor blade attachments adjacent to each other thereby shielding the rim of the rotor disk with the rotor blade attachment platform section.

13. The method as recited in claim 9, wherein the rotor blade attachment platform section extends from the rotor blade attachment root section received within a slot in the rotor disk, the rotor blade attachment platform section having a first and second recess in the platform transverse to the rotor blade attachment root section, the rotor blade attachment platform section forming a top surface of the rotor blade attachment, the first recess contoured to the suction side and the second recess contoured to the pressure side.

* * * * *